United States Patent [19]
Ganskopp et al.

[11] 3,815,699
[45] June 11, 1974

[54] PORTABLE MOTORIZED GOLF CART

[75] Inventors: William F. Ganskopp; Carl Edney, both of Tryon, N.C.

[73] Assignee: Gan-Ed, Incorporated, Tyron, N.C.

[22] Filed: Apr. 23, 1973

[21] Appl. No.: 353,327

[52] U.S. Cl............. 180/11, 180/19 R, 280/DIG. 5
[51] Int. Cl............................................ B62d 51/04
[58] Field of Search................. 180/11, 19 R, 19 H; 280/DIG. 5, DIG. 6

[56] References Cited
UNITED STATES PATENTS

| | | | |
|---|---|---|---|
| 2,687,895 | 8/1954 | Rutledge | 280/DIG. 6 |
| 2,903,082 | 9/1959 | Marcus | 180/19 R |
| 3,094,185 | 6/1963 | Racoosin | 180/11 |

Primary Examiner—David Schonberg
Assistant Examiner—John A. Pekar
Attorney, Agent, or Firm—Parrott, Bell, Seltzer, Park & Gibson

[57] ABSTRACT

The cart is lightweight and portable and may be easily disassembled for transporting from one place to another and easily assembled for use. The cart includes an elongate control frame and a drive frame which is removably connected to the control frame and carries an electric motor and a battery for driving the cart in front of the user so that the cart may be used in pacing the walking speed of the user. The control frame includes a front guide wheel for supporting the front portion of the cart so that it may move along unattended by the user except for changing direction. The two drive wheels may be easily moved to a free wheeling position so that the cart may be easily pushed or pulled by the user in case of battery failure or the like.

6 Claims, 10 Drawing Figures

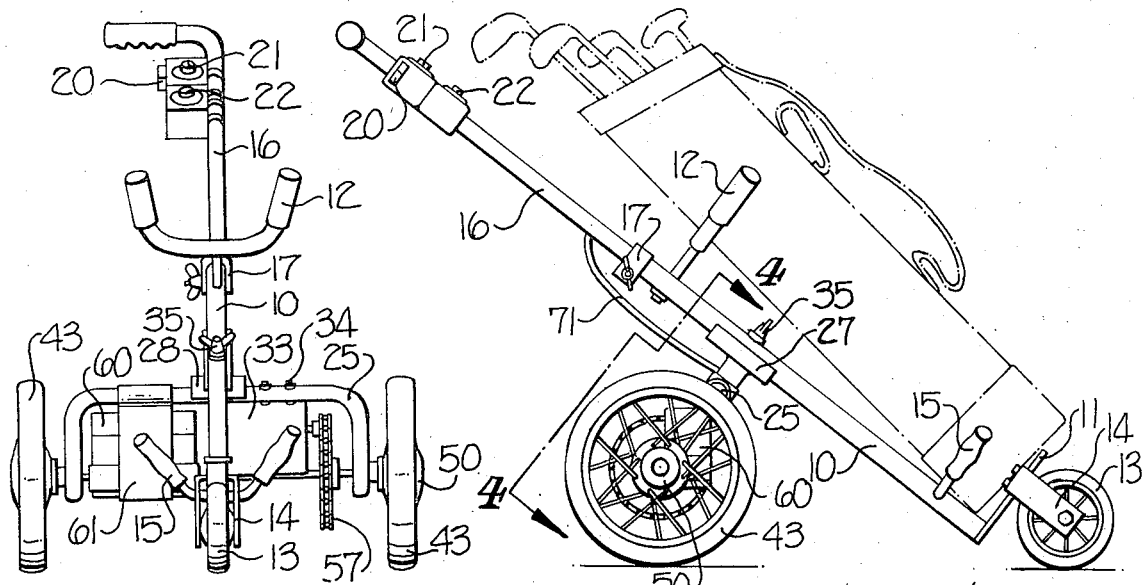
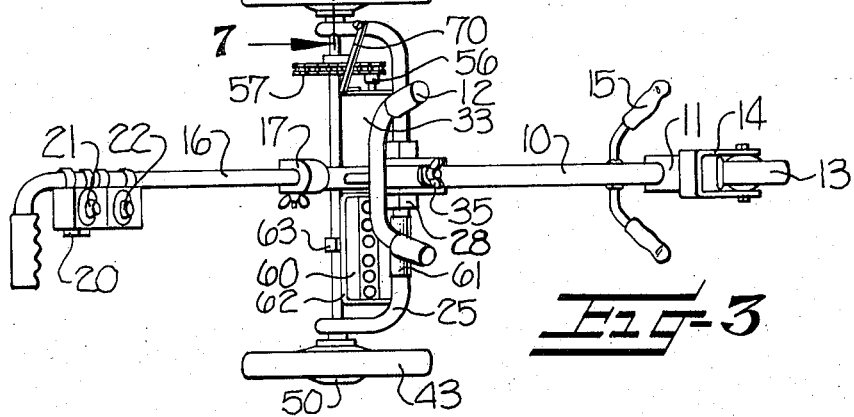
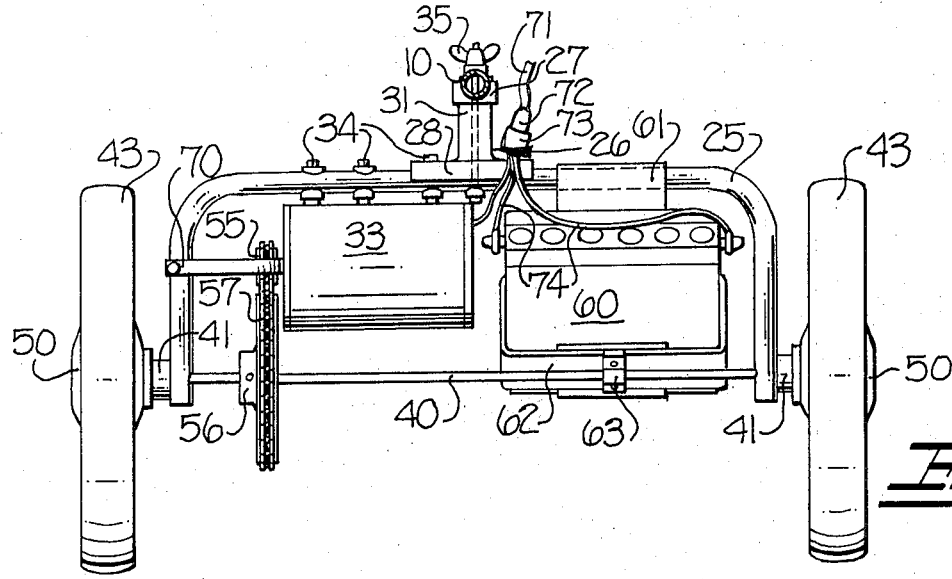

PORTABLE MOTORIZED GOLF CART

The present invention relates generally to a self-propelled golf cart and more particularly to a cart which is lightweight and portable and may be easily disassembled for transportation from one location to another and easily assembled for use.

Many different types of self-propelled golf carts have been proposed and some of these carts have been driven by electric motors and others by gasoline engines. However, most of these prior types of golf carts have been heavy and are not easily moved from one location to another. Also, most self-propelled golf carts which have been used by golfers who prefer to walk are adapted to be moved along behind the player and therefore do not provide any aid to the walker when moving up an incline.

With the foregoing in mind, it is an object of the present invention to provide a lightweight and portable self-propelled golf cart which can be easily assembled and disassembled and which is adapted to move along in front of the player and which aids in pacing the walking speed of the player and may be useful in moving up hills, inclines and the like.

In accordance with the present invention, the golf cart includes two main sub-assemblies which may be easily assembled and disassembled and comprise an elongate control frame including a golf bag support frame member having golf bag support brackets and a guide wheel at one end. A tubular control handle is removably connected at one end to the other end of the golf bag support frame member and supports an on-off switch, a speed control switch and a timer switch for ease of manipulation by the user. A drive frame is removably connected to the control frame and is disposed in substantially right angular relationship thereto. The drive frame comprises a single substantially U-shaped frame member with an axle supported for rotation in the free ends and wheels removably connected to opposite ends of the axle. The drive wheels may be selectively positioned on the axle for rotation therewith or for free rotation thereon. An electric drive motor is carried by the medial portion of the U-shaped tubular frame member and is drivingly connected to the axles and a battery is supported between the axle and the medial portion of the U-shaped tubular frame member. The battery and electric motor are very compact and are supported on the drive frame in the space between the medial portion of the U-shaped tubular frame member and the axle so that the assembled golf cart has substantially the same appearance and size as a conventional type of manually pulled golf cart.

Other objects and advantages will appear as the description proceeds when taken in connection with the accompanying drawings, in which FIG. 1 is a front elevational view of the assembled golf cart;

FIG. 2 is a side elevational view of the golf cart;

FIG. 3 is a top plan view of the cart;

FIG. 4 is an enlarged sectional view taken substantially along the line 4—4 in FIG. 2;

Figure 5:
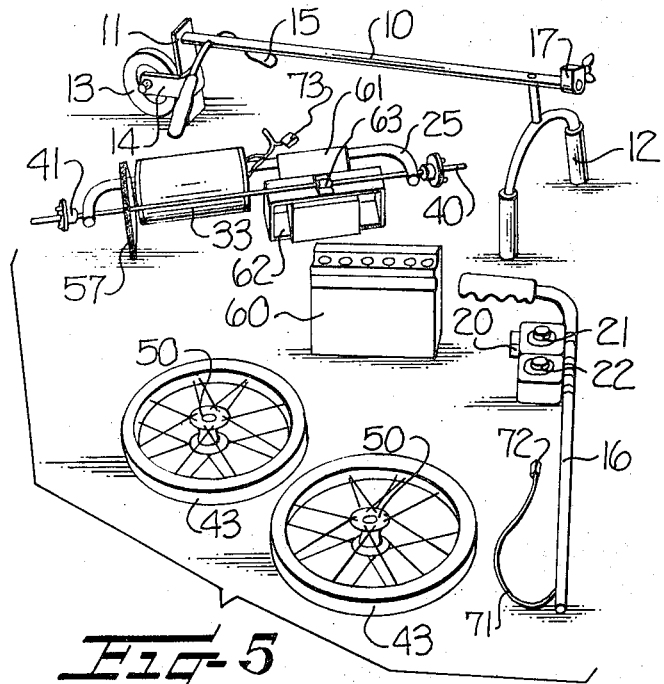
FIG. 5 is a perspective view of the various parts of the golf cart when disassembled for transportation.

The golf cart includes an elongate control frame formed of a single tubular golf bag support frame member having a golf bag support bracket 11 fixed at one end thereof and extending outwardly at a right angle therefrom. An upper, substantially U-shaped golf bag support bracket 12 is suitably secured to the upper end of the frame member 10 and is supported to cradle the upper portion of the golf bag, as illustrated in FIG. 2 in dotted lines, in spaced relationship from the frame member 10. A forward guide wheel 13 is supported for rotation in a U-shaped bracket 14 which is in turn fixed at its upper end on the golf bag support 11. A second golf bag support bracket 15 extends outwardly from opposite sides of the frame member 10. The golf bag support brackets 12 and 15, with the golf support bracket 11, form a cradle in which the golf bag is adapted to rest. If desired, straps and the like may be utilized to maintain the golf bag in the cradle.

A tubular control handle 16 is removably connected at its lower end to the upper end of the tubular frame member 10 by means of a clamp bracket 17 which is secured to the frame member 10. The lower end of the tubular control handle 16 fits into the upper end of the tubular frame member 10 and may be maintained in adjusted position by tightening the clamp bracket 17. Suitable controls are provided on the control handle 16 and include an on-off switch 20 supported in the housing supporting a speed control switch 21. The rotary position of the speed control switch 21 may be varied to change the speed of movement of the golf cart to suit the speed of the user of the golf cart. A rotary timer switch 22 is also supported on the control handle 16 and may be set to cause the drive motor to operate for a predetermined time interval.

Figure 6:
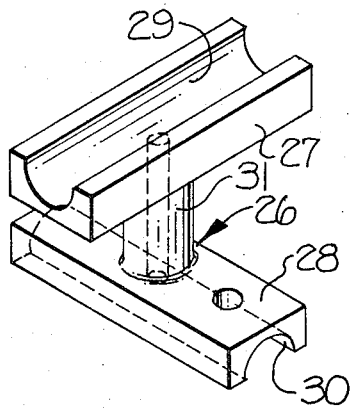
FIG. 6 is an isometric view of the connector for removably connecting the elongate control frame to the drive frame.

A drive frame is removably connected to the control frame and includes a single substantially U-shaped tubular frame member 25. A cast connector bracket, broadly indicated at 26 in FIG. 6, is provided to removably connect together the control frame and the drive frame. The cast connector bracket 26 includes perpendicular upper and lower support arms 27, 28 which are provided with respective semicircular grooves 29, 30 for receiving corresponding portions of the golf bag support frame 10 and the drive frame member 25. An extension 31 is provided between the upper and lower arms 27, 28 and provides a substantial separation between the semicircular grooves and between the upper portion of the drive frame member 25 and the lower portion of the frame member 10.

An electric variable speed drive motor 33 is supported on the medial portion of the U-shaped support frame 25 by screws 34, (FIG. 4) one of which extends through the lower arm 28 of the connector bracket 26 and maintains it in fixed position on the medial portion of the U-shaped frame member 25. A connector bolt is preferably fixed at its lower end to the medial portion of the frame 25 and extends upwardly through the connector bracket 26 and the tubular frame member 10 and its upper end is provided with a wing nut 35 which may be tightened to maintain the frame member 10 in engagement with the semicircular groove 29 in the upper arm 27 of the connector bracket 26.

Figure 7:
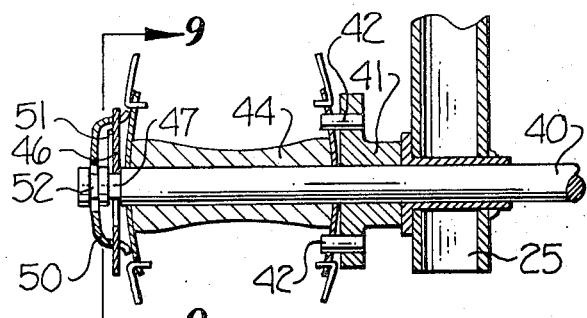
FIG. 7 is an enlarged fragmentary vertical sectional view through the hub portion of one of the drive wheels and being taken substantially along the line 7—7 in FIG. 3.

An axle 40 is supported for rotation in the free ends of the U-shaped tubular frame member 25 and extends outwardly beyond opposite sides thereof. Drive hubs 41 are fixed on the axle 40 (FIGS. 7 & 8) and are provided with outwardly extending drive pins 42. Drive wheels 43 are removably supported on opposite ends of the axle 40 and means is provided for selectively connecting the wheels 43 to the axle 40 for rotation therewith and for permitting free rotation of the wheels on the axle 40, in the event it is desirable or necessary to manually move the golf cart. The inner flange of the hub 44 of each drive wheel 43 (FIGS. 7 & 8) is provided with holes 45 into which the drive pins 42 move when the wheel 43 is moved to the inner position shown in FIG. 7 so that the wheel 43 is drivingly connected to the axle 40.

Figure 9:
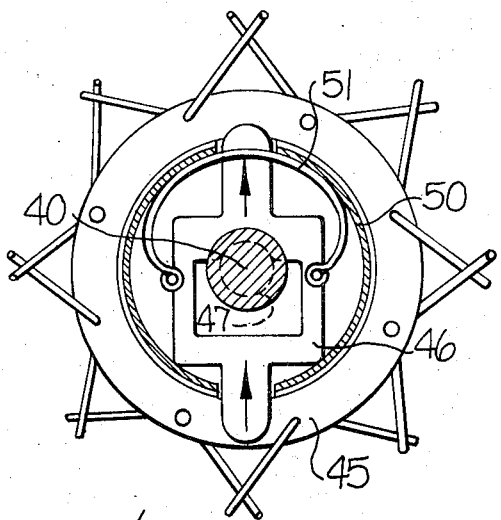
FIG. 9 is an enlarged fragmentary vertical sectional view taken substantially along the line 9—9 in FIG. 7.
Figure 8:
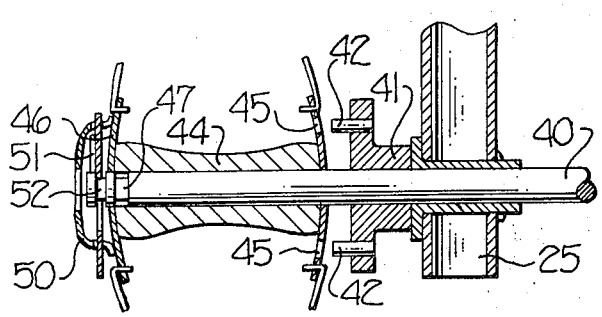
FIG. 8 is a view similar to FIG. 7 but illustrating the drive wheel being positioned for free rotation on the axle.

The wheel 43 is maintained in this drivingly connected position by means of a slide latch 46 (FIGS. 7 & 9) which is resiliently urged to the lowermost position shown in FIG. 9 so that its upper portion engages a first locking groove 47 in the axle 40. The sliding latch 46 is supported for vertical sliding movement in a hub cover 50 and is normally urged to the lowermost position by a spring 51 which engages the hub cover 50. The sliding latch 46 may be manually raised so that it moves out of the locking groove 47 and the wheel 43 then may be moved outwardly on the axle 40 and the sliding latch may be engaged in a second locking groove 52 in the axle 40, as shown in FIG. 8. In this position, the wheel 43 is free to rotate on the axle 40. To remove the wheel 43 from the axle 40, the sliding latch 46 is again raised and the wheel is moved outwardly to remove it from the axle. To replace the wheel on the axle, the sliding latch 46 is raised and the hub portion of the wheel is moved onto the outer end of the axle and the sliding latch 46 may be released to move the wheel into a freely rotating position, as shown in FIG. 8 or to a driving position, shown in FIG. 7.

Figure 10:
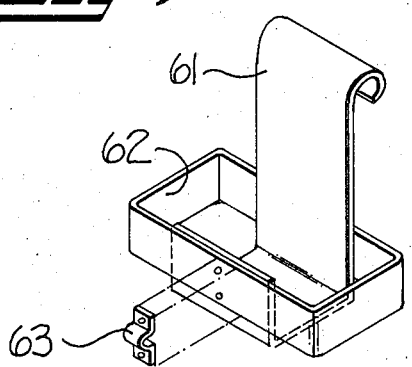
FIG. 10 is an isometric view of the battery support bracket removed from the U-shaped tubular frame member and the axle.

The variable speed drive motor 33 is provided with a drive sprocket 55 (FIG. 4) and a sprocket 56 is fixed on the axle 40. A chain 57 drivingly connects the sprockets 55, 56 to impart rotation to the axle 40 when the variable speed motor 33 is energized. A battery 60 is supported for easy removal and replacement in a battery support bracket 61 (FIG. 10) the upper end of which is supported on the medial portion of the U-shaped support frame 25. An encircling bracket 62 is suitably connected to the bracket 61 to receive the battery 60. The lower rear portion of the support bracket 61 is provided with a support clip 63 which surrounds the axle 40 and supports the lower end of the battery 60 so that it is in substantially an upright position as the cart moves along on the ground. If desired, suitable means, such as a strap, not shown, may be utilized to maintain the battery 60 in the support bracket 61.

A brace 70 is connected at one end to the electric motor 33 and at its other end to the vertical leg of the U-shaped support frame member 25. This brace 70 may also be utilized to support a chain guard, not shown. A group of electric wires 71 are connected to the speed control switch 21, the timer control 22 and the on-off switch 20 and pass downwardly through the control handle 16 and outwardly through an opening therein. A connector plug 72 is provided at the lower ends of the electric wires 71. This connector plug 72 is adapted to be removably connected to a similar plug 73 which joins electric wires 74 extending from the battery 60 and the motor 33.

The disassembled golf cart, as illustrated in FIG. 5, can be easily transported in the trunk of an automobile or the like and with the battery 60 removed, the parts can be transported in any position. To assemble the cart for use, the golf bag support frame 10 is connected to the drive frame member 25 by placing the frame 10 in the semicircular groove 29 of the upper arm 27 of the connector bracket 26 with the bolt extending therethrough and then tightening the wing nut 35. The lower end of the control handle 16 is then inserted in the upper end of the frame member 10 and the clamp bracket 17 is tightened with the control handle 16 in the proper adjusted position. The wheels 43 are then placed on the opposite ends of the axle 40 with the holes in the inner flanges thereof being engaged by the drive pins 42. The battery 60 then may be placed in the support bracket 61 and the connectors 72, 73 are joined together. The golf cart is then ready for operation and may be operated by means of the on-off switch 20.

The on-off switch 20 is preferably of the rocking three position type, one position being the on position, another position being the off position, and the third position being a timer position. The speed of movement of the golf cart can be controlled by varying the rotational position of the speed control switch 21. If it is desired to have the golf cart proceed the user for a predetermined distance and then stop, the timer 22 may be set to operate the motor 33 a sufficient length of time to move the cart the required distance and the on-off switch 20 is then positioned in the timer control position. Since the golf cart of the present invention is adapted to move in front of the user, the golf cart may aid the user in walking up hills or inclines as the player holds onto the handle with the cart moving in front of him.

In the drawings and specification, there has been set forth a preferred embodiment of the invention, and although specific terms are employed, they are used in a generic and descriptive sense only and not for purposes of limitation.

That which is claimed is:

1. A lightweight and portable self-propelled golf cart comprising
   a. an elongate control frame including a single tubular frame member, a golf bag support fixed to one end of said tubular frame member, and extending outwardly at a right angle therefrom, a guide wheel supported for rotation on said golf bag support, golf bag support brackets supported adjacent opposite ends of said single tubular frame member, a tubular control handle removably connected at one end to the other end of said single tubular frame member,
   b. a drive frame including a single substantially U-shaped tubular frame member, an axle supported for rotation in the free ends of said U-shaped tubular frame member and extending outwardly from opposite sides thereof, a pair of wheels removably supported on opposite ends of said axle, means selectively connecting said wheels to said axle for rotation therewith, an electric motor carried by the medial portion of said U-shaped tubular frame member and being drivingly connected to said axle, a battery supported between the medial portion of said U-shaped tubular frame member and said axle and adjacent said electric motor for supplying energy to said electric motor, and c. connector means for removably connecting together said single tubular frame member and the medial portion of said U-shaped tubular frame member whereby said U-shaped tubular frame member extends perpendicular to said single tubular frame member.

2. A golf cart according to claim 1 including a manually operable on-off switch carried by said control handle and interconnected between said motor and said battery for selectively imparting movement to said golf cart, and a speed control switch operatively associated with said on-off switch to control the speed of movement of said golf cart.

3. A golf cart according to claim 2 including a timer switch operatively associated with said on-off switch and being operable to control the length of time said motor operates to therby control the distance said golf cart will travel before stopping.

4. A golf cart according to claim 1 wherein said connector means comprises a cast bracket including perpendicular upper and lower support arms having semicircular grooves formed therein, an extension between said upper and lower support arms to provide a substantial separation between the semicircular grooves, and a bolt extending through said cast bracket, said U-shaped frame, and said single tubular frame member to removably connect said control frame to said drive frame.

5. A golf cart according to claim 1 including a battery support bracket fixed at its upper end to the medial portion of said U-shaped tubular frame member and at its lower end to said axle.

6. A golf cart according to claim 1 wherein said means selectively connecting said wheels to said axle comprises a pair of drive hubs fixed to opposite end portions of said axle and adjacent said free ends of said U-shaped tubular frame member, drive pins extending outwardly from each of said hubs, openings provided in said wheels for engagement drive said driv pins when aligned therewith, and means for selectively positioning said wheels with the holes being out of engagement with said drive pins so that the wheels will rotate freely on said axles and for positioning the wheels with said drive pins engaged in said holes so that said wheels rotate with said axles.

* * * * *

UNITED STATES PATENT OFFICE
CERTIFICATE OF CORRECTION

Patent No. 3,815,699　　　　　　　　　Dated June 11, 1974

Inventor(s) William F. Ganskopp and Carl Edney

It is certified that error appears in the above-identified patent and that said Letters Patent are hereby corrected as shown below:

Column 5, Line 27, change "therby" to --thereby--.
　　Column 6, Line 21 should read --said wheels for engagement
　　　　with said drive pins when--.

Signed and sealed this 8th day of October 1974.

(SEAL)
Attest:

McCOY M. GIBSON JR.　　　　　　　　　C. MARSHALL DANN
Attesting Officer　　　　　　　　　　Commissioner of Patents